United States Patent
Zup et al.

[11] Patent Number: 6,046,561
[45] Date of Patent: Apr. 4, 2000

[54] COMMUTATION CONTROL METHOD FOR A SWITCHED RELUCTANCE MACHINE

[75] Inventors: Andrew Karl Zup; Robert John Disser, both of Dayton, Ohio; Michael Bernard Monahan, Webster, N.Y.

[73] Assignee: General Motors Corporation, Detroit, Mich.

[21] Appl. No.: 09/197,882

[22] Filed: Nov. 23, 1998

[51] Int. Cl.[7] ................ H02P 6/12; H02P 7/05
[52] U.S. Cl. .............. 318/439; 318/254; 318/701
[58] Field of Search .................. 318/138, 254, 318/439, 685, 696, 701

[56] References Cited

U.S. PATENT DOCUMENTS

| | | | |
|---|---|---|---|
| 4,164,969 | 8/1979 | Kastilahn et al. | 318/696 |
| 4,477,196 | 10/1984 | Ito | 368/157 |
| 4,480,218 | 10/1984 | Hair | 318/696 |
| 4,520,302 | 5/1985 | Hill | 318/696 |
| 4,551,708 | 11/1985 | Welburn | 340/347 |
| 4,670,696 | 6/1987 | Byrne et al. | 318/701 |
| 4,684,866 | 8/1987 | Nehmer et al. | 318/696 |
| 4,707,650 | 11/1987 | Bose | 318/685 |
| 4,904,917 | 2/1990 | Hakluytt | 318/696 |
| 4,922,169 | 5/1990 | Freeman | 318/254 |
| 4,933,620 | 6/1990 | MacMinn et al. | 318/696 |
| 4,975,608 | 12/1990 | Aspden | 310/114 |
| 5,010,267 | 4/1991 | Lipo et al. | 310/162 |
| 5,072,166 | 12/1991 | Ehsani | 318/696 |
| 5,196,775 | 3/1993 | Harris et al. | 318/638 |
| 5,223,771 | 6/1993 | Chari | 318/254 |
| 5,227,709 | 7/1993 | Gauthier et al. | 318/685 |
| 5,296,793 | 3/1994 | Lang | 318/715 |
| 5,321,342 | 6/1994 | Kruse | 318/254 |
| 5,378,975 | 1/1995 | Schweid et al. | 318/685 |
| 5,661,381 | 8/1997 | Blackburn | 318/254 |
| 5,920,175 | 7/1999 | Jones et al. | 318/701 |

*Primary Examiner*—Bentsu Ro
*Attorney, Agent, or Firm*—Robert M. Sigler

[57] ABSTRACT

An improved commutation control method precisely controls commutation in a switched reluctance machine with a relatively low resolution position encoder and a low cost micro-processor based controller. The control method involves the formation of a motor position signal having logic level transitions, or edges, that define base commutation signals for commutating the motor phase windings in sequence with no phase advance. When no phase advance is desired, the controller turns the phase windings on and off in time with the respective base commutation signals. When phase advance is desired, the controller turns each of the windings on and off relative to the base commutation signal for the preceding phase winding. More specifically, the turn-on and turn-off points for phase advance control are timed to occur a delay time after the edges of the base commutation signal for the preceding phase. The delay time is determined by measuring the time between two successive edges of the motor position signal, and reducing such measure by a constant value corresponding to a selected linear profile of phase advance vs. motor speed. The control method may be utilized in the context of a motor control strategy in which the motor is operated with no phase advance at low speeds, at a fixed maximum phase advance at very high speeds, and at a speed dependent variable phase advance at intermediate motor speeds.

7 Claims, 4 Drawing Sheets

COMMUTATION CONTROL METHOD FOR A SWITCHED RELUCTANCE MACHINE

This invention relates to the control of a switched reluctance machine, and more particularly to a low cost commutation control method therefor.

BACKGROUND OF THE INVENTION

Phase advance control of commutation in a switched reluctance machine is a well known expedient in the motor control art. In a particularly advantageous application of phase advance control, the commutation is advanced with increasing motor speed so that the build up of current in the phase windings tracks the peak inductance of the machine's magnetic circuit, thereby optimizing operating efficiency over a wide speed range. However, achieving precise control of the commutation phase angle using conventional control methods typically requires high resolution position encoders and/or substantial processing capability, both of which add significant cost to the system.

SUMMARY OF THE PRESENT INVENTION

The present invention is directed to an improved commutation control method that precisely controls commutation in a switched reluctance machine with a relatively low resolution position encoder and low cost micro-processor based controller. In spite of the limited resolution of the position encoder, the control method of this invention carries out the phase advance control with a resolution limited only by the resolution of the microprocessor clock. At the same time, the simplicity of the control method enables the use of an inexpensive controller having only modest processing capabilities. In a mechanization of the present invention, a single low-cost micro-processor based controller was used to control the speed and commutation of two four-phase switched reluctance machines with quadrature position encoders having a resolution of only 15 mechanical degrees.

In brief, the control method of this invention involves the formation of a motor position signal having logic level transitions, or edges, that define base commutation signals for commutating the motor phase windings in sequence with no phase advance. In the illustrated embodiment, this requirement is satisfied in a four-phase switched reluctance machine with a quadrature encoder having a resolution of 15 mechanical degrees. When no phase advance is desired, the controller turns the phase windings on and off in time with the respective base commutation signals. When phase advance is desired, the controller turns each of the windings on and off relative to the base commutation signal for the preceding phase winding. More specifically, the turn-on and turn-off points for phase advance control are timed to occur a delay time after the edges of the base commutation signal for the preceding phase. The delay time is determined by measuring the time between two successive edges of the motor position signal, and reducing such measure by a constant value corresponding to a selected linear profile of phase advance vs. motor speed. Key to the method is the recognition that this one simple subtraction can be used to produce a linear profile of phase advance vs. motor speed, and that the slope of the profile can be changed as desired simply by changing the constant value. For example, the constant value may be programmable to provide different phase advance profiles depending on the motor operating conditions.

Advantageously, the above-described control method is utilized in the context of a motor control strategy in which the motor is operated with no phase advance at low speeds, at a fixed maximum phase advance at very high speeds, and at a speed dependent variable phase advance at intermediate motor speeds. Additionally, the control method enables the use of a very simple default control to ensure that the various phase windings are energized with no phase advance if the normal phase advance control fails to properly energize the windings.

DETAILED DESCRIPTION OF THE DRAWINGS

Figure 1:
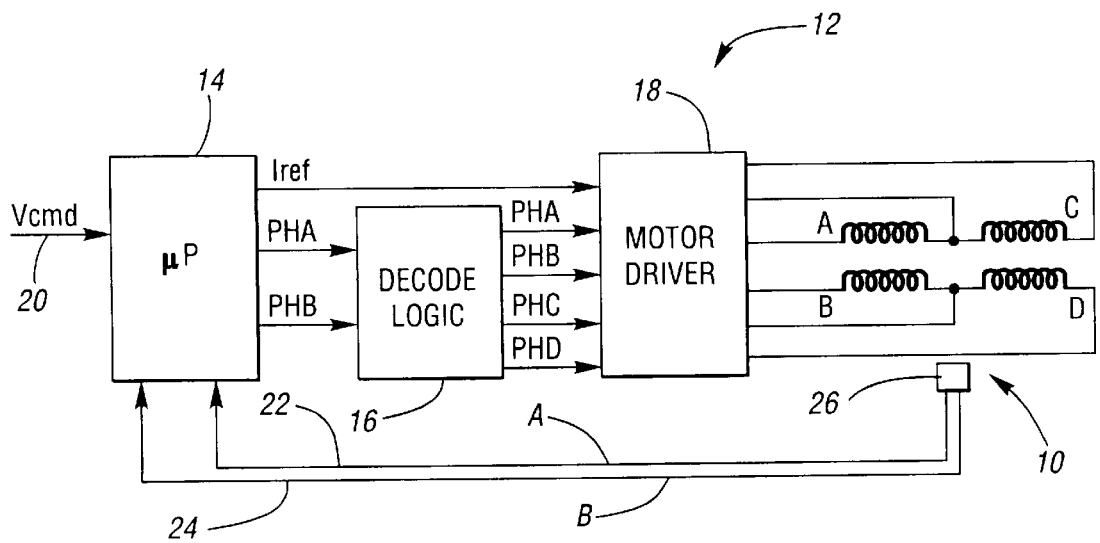
FIG. 1 is a block diagram of a micro-processor based control system for one four-phase switched reluctance machine.

Referring to the drawings, and particularly to FIG. 1, the reference numerals 10 and 12 respectively designate a four-phase switched reluctance machine, and a micro-processor based controller for controlling the operation of the machine. The controller 12 includes a micro-processor 14, decode logic circuitry 16, and a motor driver circuit 18. The phase windings A–D are inter-connected as shown so that both terminals of each winding are coupled to the driver circuit 18.

The micro-processor 14 receives a velocity command input Vcmd on line 20, and a pair of motor position signals (A, B) on lines 22 and 24. The position signals are generated by a motor position encoder 26 responsive to the rotation of the motor output shaft, not shown. In the illustrated embodiment, the encoder 26 is a quadrature encoder, and has a resolution of 15 mechanical degrees, meaning that the A and B signals are 90 degrees out of phase, and collectively, have logic level transitions which occur every 15 mechanical degrees of motor rotation. Representative signal traces of the signals A and B are depicted in Graphs B and C of FIG. 2, described below.

The micro-processor 14 has two principle functions: regulating the motor speed at the commanded value Vcmd, and scheduling the commutation control signals for the motor phase windings A–D. The motor speed is regulated through the use of a conventional current control loop, in which the micro-processor 14 generates a current command Iref for motor driver circuit 18 based on a determined speed error. The driver circuit 18; in turn, compares the current command Iref with a measure of the actual winding current, and modulates or chops the voltage applied to the respective windings at a duty cycle based on a determined current error. The scheduling of commutation is carried out, as explained in detail below, by generating a pair of commutation control signal PHA and PHB which are based on the motor position signals A and B, but variably phase shifted depending on the motor speed. The signals PHA and PHB are applied to the decode logic circuit 16, which develops individual commutation control signals for each of the phase windings, such signals being applied to the motor driver circuit 18. Thus, the motor driver circuit 18 is operative to enable and disable the energization of each of the phase windings based on the commutation signals PHA–PHD, and to modulate the application of voltage to the windings within the respective energization periods to regulate the winding current at the reference value Iref.

Figure 2A:
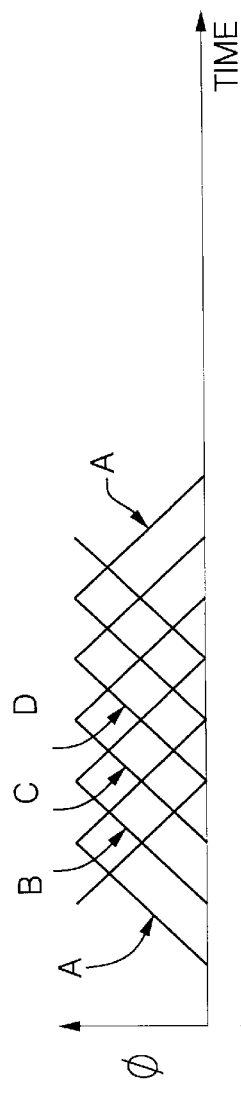
FIGS. 2A, 2B, 2C, 2D, 2E, 2F and 2G comprise a multi-graph timing diagram for the control system and machine of FIG. 1.

FIGS. 2A–G depict a series of graphs on a common time base, assuming a constant motor speed. Alternatively, the horizontal axes of the various graphs can be viewed as representing motor position. FIG. 2A depicts the magnetic coupling for each phase of the motor 10, whereas FIGS. 2B and 2C respectively depict the motor position signals A and B developed by quadrature encoder 26. It will be seen that the A and B signals are 90 degrees out of phase, and collectively, have logic level transitions (zero-to-one or one-to-zero) which occur every 15 mechanical degrees of motor rotation.

Figure 2B:
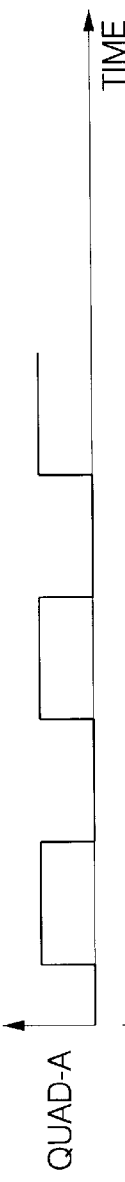
Figure 2C:
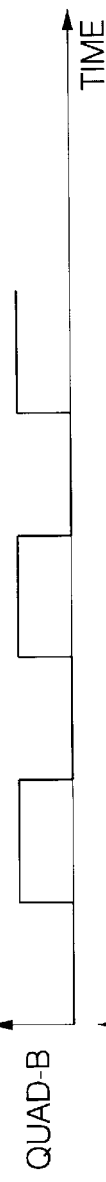
Figure 2D:
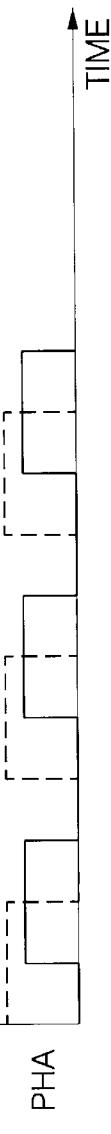
Figure 2E:
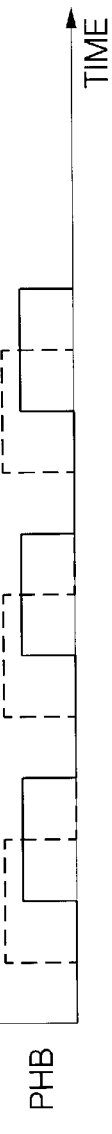
Figure 2F:
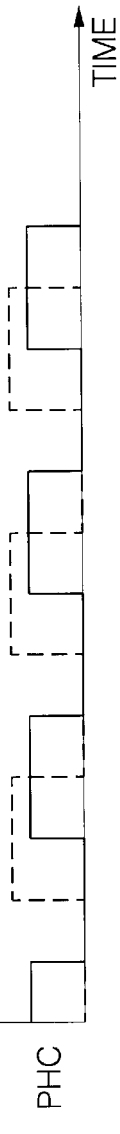
Figure 2G:
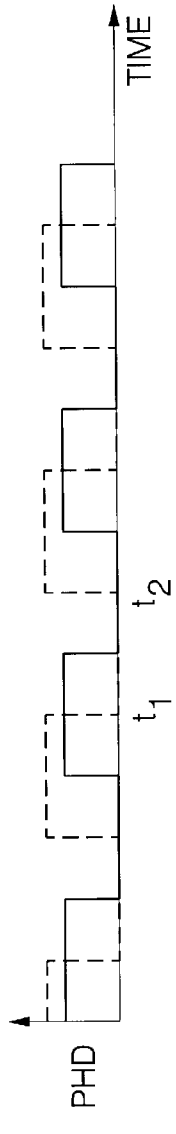

When no phase advance is desired (typically at very low motor speeds), the commutation intervals for the A and C phase windings are respectively given by the high and low periods of the quadrature A signal (FIG. 2B); and the commutation intervals for the B and D phase windings are respectively given by the high and low periods of the quadrature B signal (FIG. 2C). In each case, the logic level transitions, or signal edges, are in registry with the positive slope of the magnetic coupling for a respective phase of the machine 10. Thus, under conditions where it is desired to operate the machine 10 with no phase advance, the windings A–D can be commutated in registry with the edges of the quadrature signals A and B. In this case, the PHA and PHB signals developed by the controller 10 respectively coincide with the quadrature signals A and B, as seen in the solid traces of FIGS. 2D and 2E, and the decode logic 16 inverts the PHA and PHB signals to form the PHC and PHD signals, as seen in the solid traces of FIGS. 2F and 2G. For example, the phase winding A is turned on at time t1 and turned off at time t2, the edges of PHA at times t1 and t2 being in registry with the positive slope of the magnetic coupling for phase A.

When maximum phase advance is desired (typically at very high motor speeds), the commutation intervals for the A and C phase windings are respectively given by the high and low periods of the quadrature B signal (FIG. 2C); and the commutation intervals for the B and D phase windings are respectively given by the high and low periods of the quadrature A signal (FIG. 2B). In other words, each winding is commutated in accordance with the commutation signal for the preceding phase. For example, winding A is commutated in accordance with the PHD signal, winding B is commutated in accordance with the PHA signal, and so on. The fully advanced commutation intervals for the windings A–D are shown by the broken traces in FIGS. 2D–2G, respectively. This results in a phase advance of 15 degrees.

Figures 4A, 4B, 4C:
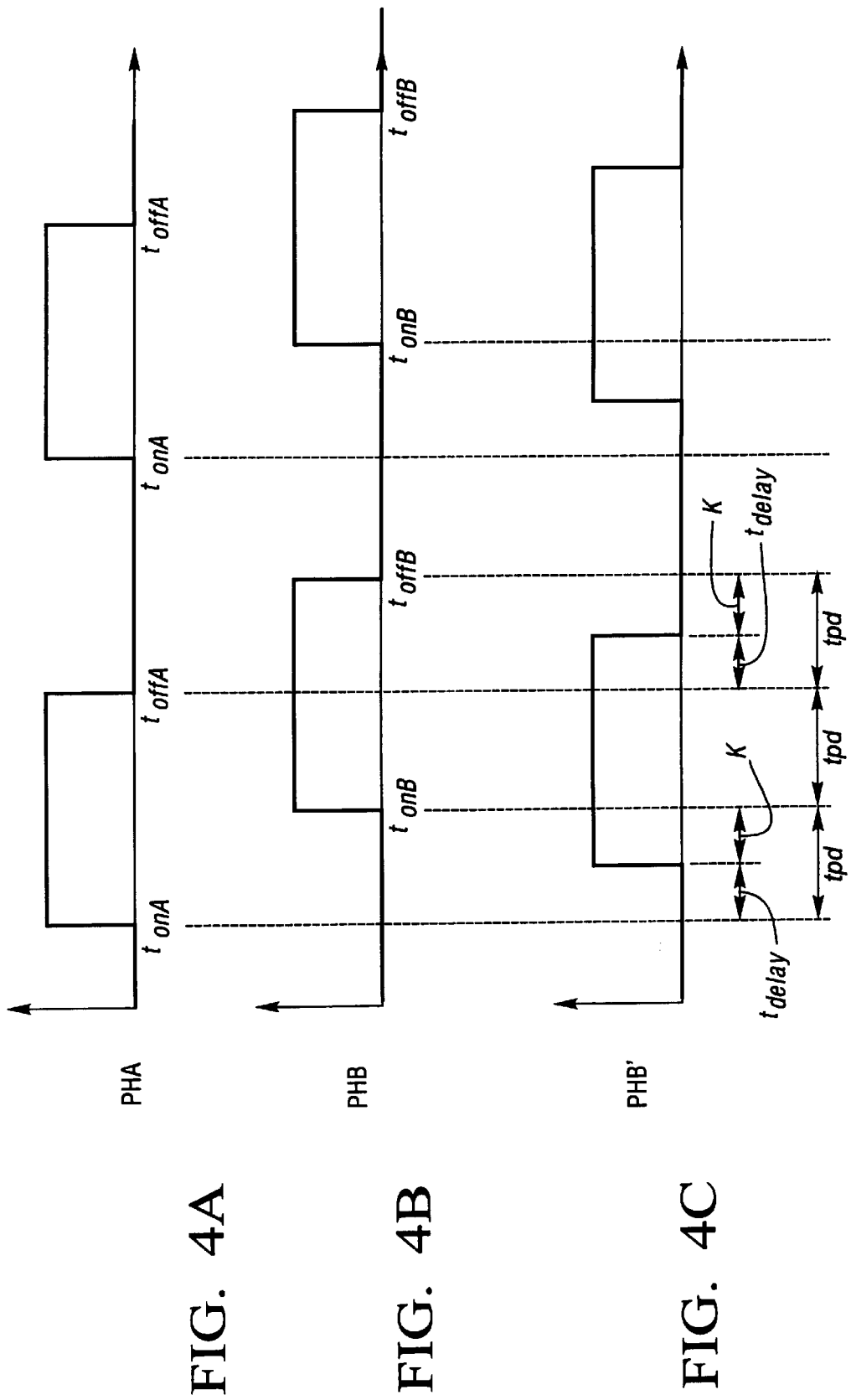
FIGS. 4A, 4B and 4C comprise an expanded timing diagram illustrating the phase advance commutation control method of this invention.

When it is desired to advance the phase winding energization less than 15 degrees (typically at intermediate motor speeds), the commutation intervals are controlled to occur intermediate the broken and solid traces depicted in FIGS. 2D–G. In this case, the turn-on and turn-off points are determined relative to the turn-on and turn-off points of the base commutation signal for the preceding phase, delayed by a computed interval $t_{delay}$, as explained more fully below in reference to FIGS. 4A–4C.

Figure 3:
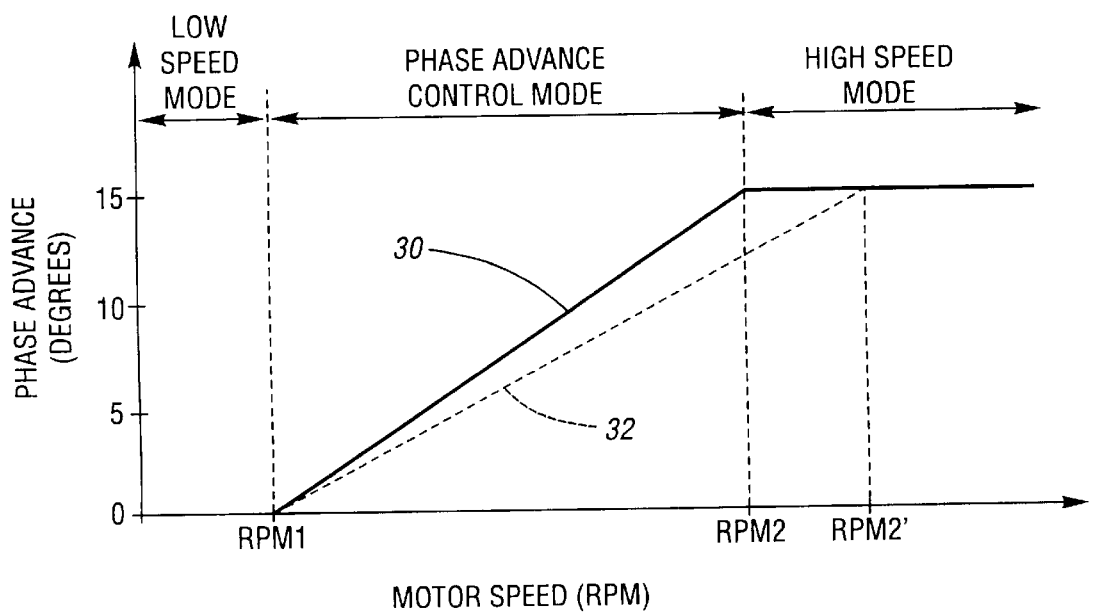
FIG. 3 is a graph depicting an exemplary profile of commutation phase advance vs. motor speed for the control system of FIG. 1.

The above-described control strategy is graphically depicted in FIG. 3, where the scheduled phase advance is given as a function of motor speed. Below a first defined motor speed, designated RPM1, the motor 10 is operated in a Low Speed Mode with no phase advance. Above a second defined motor speed, designated RPM2, the motor 10 is operated in a High Speed Mode with maximum phase advance of 15 degrees. At motor speeds intermediate RPM1 and RPM2, the motor 10 is operated in a Phase Advance Control Mode in which the phase advance is varied in linear relationship with motor speed between 0 and 15 degrees, as shown by the solid trace 30. In certain cases, such as in braking, it may be desired to adopt a different phase advance profile, such as shown by the broken trace 32; in this case, the maximum phase advance is reached at a motor speed of RPM2'.

According to this invention, the turn-on and turn-off points for the Phase Advance Control Mode are determined by computing a delay time from the commutation signal for the preceding phase. This approach is depicted in more detail in FIGS. 4A and 4B, which depict the commutation signals PHA and PHB, respectively, and FIG. 4C, which depicts a variably phase-advanced commutation signal (PHB') for phase B. As indicated above, phase B is commutated in accordance with commutation signal PHB for no phase advance, and in accordance with commutation signal PHA for maximum (15 degrees) phase advance. The variably advanced phase B commutation signal PHB' of FIG. 4C has the same period as the base commutation signal PHB of FIG. 4B, and is phase-advanced by a variable amount less than 15 degrees. As indicated above in respect to FIGS. 2A–G, the turn-on and turn-off of the variable phase-advance commutation signal PHB' are determined relative to the turn-on and turn-off points of the base commutation signal for the preceding phase (PHA), delayed by a computed delay interval $t_{delay}$. Thus, the turn-on and turn-off points for PHB' are defined as $t_{onA}+t_{delay}$ and $t_{offA}+t_{delay}$, where $t_{onA}$ and $t_{offA}$ are the turn-on and turn-off points of base commutation signal PHA. In each case, the delay time $t_{delay}$ is determined by measuring the time interval between successive edges of the quadrature signal, such as the intervals designated $t_{pd}$ in FIGS. 4A–4C, and subtracting a constant, but programmable, value K. In other words, the delay interval $t_{delay}$ is given by $t_{pd}$–K. If K is maintained fixed, and the motor speed varies, the amount of phase advance will vary in linear relation to the motor speed, producing a phase advance vs. motor speed profile substantially as depicted in the Phase Advance Control Mode portion of FIG. 3.

As an example of the control method, suppose that the phase advance control profile of FIG. 3 is designed with RPM1=400 RPM and RPM2=6400, and a maximum phase advance of 15 degrees as shown. The constant K is set equal to the time required for the motor to rotate through 15 degrees (i.e., the time between successive edges of the motor position signal) when running at a speed of RPM2. As a practical matter, RPM1 is so small relative to RPM2 in most applications that the effect of RPM1 can be neglected. The delay time $t_{delay}$, in turn, is computed according to the measured time between successive edges of the motor position signal, less the constant K. At a speed of RPM2, the measured time will be equal to the constant, resulting in a delay time $t_{delay}$ of zero, and each phase winding will be energized in time with the base commutation signal for the preceding phase, resulting in a phase advance of 15 degrees. As the motor speed decreases, the measured time between successive edges of the position signal will increase, resulting in a delay time $t_{delay}$ of linearly increasing value, thus linearly decreasing the phase advance with decreasing motor speed. At a motor speed of 3200 RPM, for example,— the mid-point speed of the Phase Advance Control Mode—the measured time will be twice as large as at the speed of RPM2, neglecting the effect of RPM1, and therefore twice the value of the constant K. In this case, the delay time $t_{delay}$ is one-half of the measured time, resulting in commutation of the phase windings with a phase advance of 7.5 degrees. In a micro-processor based controller, of course, time intervals are determined by counting the pulses of a fixed frequency clock within the micro-processor. Accordingly, it is more accurate to speak in terms of the number of clock pulses counted between two events, as opposed to the corresponding time interval. Thus, the constant K, for example, is determined based on the clock frequency, and represents a certain number of counts. In any event, it will be seen that the simple expedient of subtracting a constant time K from the measured interval $t_{pd}$ results in a linear control of the commutation phase advance.

Figure 5:
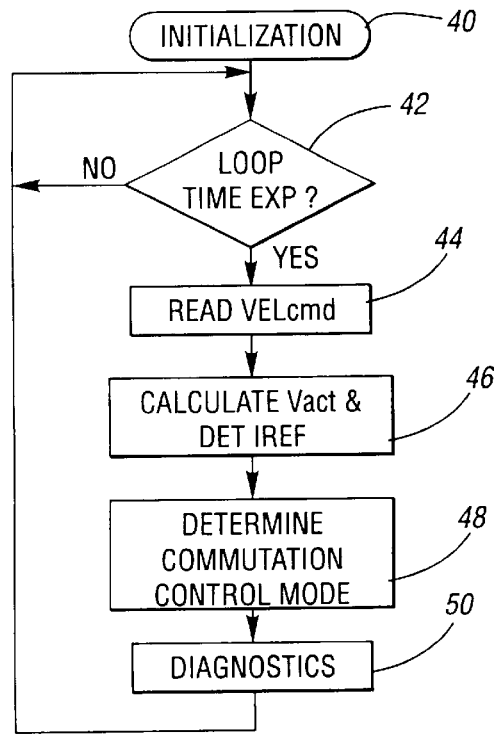
FIGS. 5 and 6 are flow diagrams depicting the operation of the microprocessor based controller of FIG. 1 in carrying out the control method of this invention.
Figure 6:
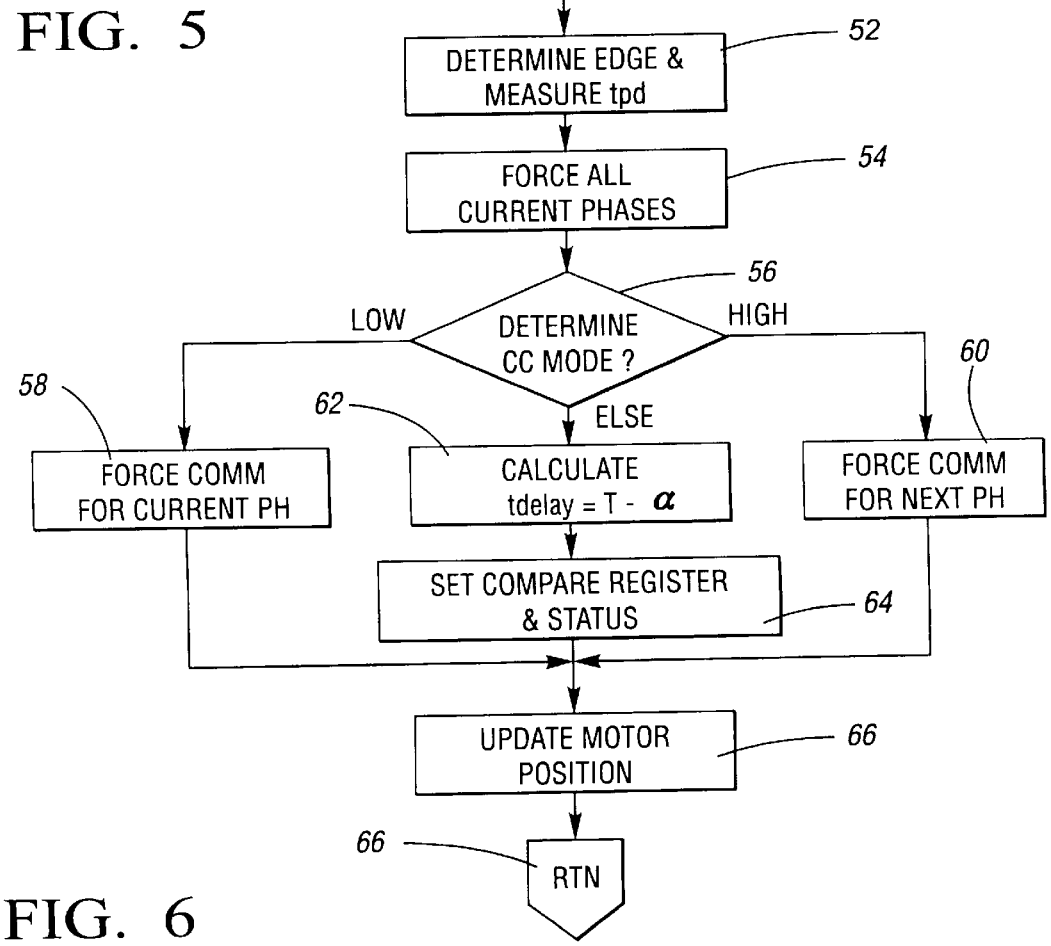

FIGS. 5–6 depict flow diagrams representative of computer program instructions for carrying out the control method of this invention with the micro-processor based controller 12 of FIG. 1. The flow diagram of FIG. 5 represents a main or background loop, while the flow diagram of FIG. 6 represents an interrupt service routine (ISR) executed at each motor position signal transition.

Referring to FIG. 5, the block 40 designates a series of initialization instructions for setting various terms and parameters to initial values, and for properly configuring the microprocessor input and output ports. At a periodic rate determined by the decision block 42, the blocks 44–50 are executed to read the motor velocity command Vcmd, to determine a reference current Iref for motor 10, to determine the appropriate control mode, and to perform diagnostic routines for failure detection. As indicated above, the reference current Iref may be based on the error, or difference, between the velocity command Vcmd and the actual velocity, which in turn, may be determined by measuring the time between successive pulses of the motor position signal. The commutation control mode is determined, as explained in reference to FIG. 3, in accordance with the measured motor speed, relative to the selected speed parameters RPM1 and RPM2.

As indicated above, the ISR flow diagram of FIG. 6 is executed at each logic level transition of the motor position signals on lines 22 and 24. To this end, each of the lines 22 and 24 is connected to an interrupt port of the micro-processor 14. In responding to each interrupt, the micro-processor 14 first determines which sensor edge produced the interrupt and measures the time $t_{pd}$ since the last interrupt, as indicated by the block 52. For example, a rising edge on the quadrature-A signal (line 22) is detected as the leading edge of the PHA commutation signal, and a rising edge on the quadrature-B signal (line 24) is detected as the leading edge of the PHB commutation signal. Block 54 serves to issue a turn-on command to any phase that should be on, based on the determined sensor edge. For example, if it is determined at block 52 that the leading edge of the quadrature-A signal caused the interrupt, block 54 causes the micro-processor 14 to command a turn-on of phases A and D, even though such phases may already be conducting; this provides a default commutation control to ensure that the windings A–D are commutated, albeit with no phase advance, in the event that the phase advance control fails to turn-on or enable the appropriate phase.

Blocks 56–64 determine the commutation control mode based on the speed of the motor 10, and schedule the turn-on or turn-off points for the respective phase windings. If the motor speed is less than or equal to RPM1, the Low Speed Mode is in effect, and the block 58 is executed to commutate the respective phase windings in accordance with their base commutation signals for no phase advance. For example, if the ISR is servicing an interrupt caused by a leading (rising) edge of the quadrature-A signal, block 58 causes micro-processor 14 to command turn-on of phase A, and a turn-off of phase C. This coincides with the solid traces in FIGS. 2D–2G. If the motor speed is greater than or equal to RPM2, the block 60 is executed to commutate the next phase winding of the energization sequence to provide maximum (15 degrees) phase advance. For example, if the ISR is servicing an interrupt caused by a leading (rising) edge of the quadrature-A signal, block 60 causes micro-processor 14 to command turn-on of phase B, and a turn-off of phase D. This coincides with the broken traces in FIGS. 2D–2G. If the motor speed is between RPM1 and RPM2, the Phase Advance Control Mode is in effect, and the blocks 62 and 64 are executed to schedule the commutation of the next phase winding of the energization sequence. This involves calculating or retrieving from memory a constant value K, calculating a delay time $t_{delay}$ according to the difference ($t_{pd}$–K), and configuring the appropriate micro-processor output port (PHA or PHB) to change logic level after a time corresponding to $t_{delay}$. For example, if the ISR is servicing an interrupt caused by a leading (rising) edge of the quadrature-A signal, blocks 62–64 cause micro-processor 14 to schedule a zero-to-one transition of PHB commutation signal after the delay time $t_{delay}$ has elapsed. This sets up the variable phase delay for phases B and D as discussed above. Regardless of mode, the block 68 is then executed to update the motor position for the background loop of FIG. 1, completing the ISR.

In summary, this invention provides a simple but precise commutation control method which can be efficiently carried out by a low-cost micro-processor based controller. While this invention has been described in reference to the illustrated embodiment, it is expected that various modifications in addition to those suggested above will occur to those skilled in the art. For example, the control method may be equally applied to motors having a different number of phase windings or different hardware and driver circuitry. In this regard, it will be understood that the scope of this invention is not limited to the illustrated embodiment, and that control methods incorporating these and other modifications may fall within the scope of this invention, which is defined by the appended claims.

The embodiments of the invention in which an exclusive property or privilege is claimed are defined as follows:

1. A phase advance commutation method for a multiple phase switched reluctance motor having phase windings which are sequentially energized by a motor controller, the method comprising the steps of:

generating motor position related pulses associated with each phase winding and defining base commutation signals for commutating respective associated phase windings with no phase advance; and in response to the generation of each pulse:
identifying the phase winding associated with said pulse;
measuring the time that has elapsed since a preceding pulse;
computing a delay time according to the measured time less a constant value corresponding to a desired phase advance vs. motor speed profile; and
commutating a phase winding sequentially after said identified phase winding upon expiration of the computed delay time.

2. The method set forth in claim 1, including the step in response to the generation of each pulse of:
  commutating the identified phase winding without delay if commutation with no phase advance is desired.

3. The method set forth in claim 1, including the step in response to the generation of each pulse of:
  commutating the identified phase winding without delay if the identified phase winding has not already been commutated, thereby defining a default mode of operation in which said phase windings are commutated with no phase advance.

4. The method set forth in claim 1, including the step in response to the generation of each pulse of:
  commutating the phase winding sequentially after said identified phase winding without delay if commutation with a maximum phase advance is desired.

5. A phase advance commutation method for a multiple phase switched reluctance motor having phase windings which are sequentially energized by a motor controller, the method comprising the steps of:
  generating motor position related pulses associated with each phase winding and defining base commutation signals for commutating respective associated phase windings with no phase advance;
  defining a low speed mode of operation below a first motor speed threshold, a high speed mode of operation above a second motor speed threshold, and a phase advance control mode of operation between said first and second speed thresholds; and
  in response to the generation of each pulse:
    identifying the phase winding associated with said pulse;
    if said low speed mode is in effect, commutating the identified phase winding without delay, thereby to commutate said phase windings with no phase advance;
    if said high speed mode is in effect, commutating a phase winding sequentially after said identified phase winding without delay, thereby to commutate said phase windings with a fixed maximum phase advance; and
    if said phase advance control mode is in effect, measuring the time that has elapsed since a preceding pulse, computing a delay time according to the measured time less a constant value, and commutating the phase winding sequentially after said identified phase winding upon expiration of the computed delay time, thereby to commutate said phase windings in accordance with a linear phase advance vs. motor speed profile corresponding to said constant value.

6. A phase advance commutation method for a multiple phase switched reluctance motor comprising the steps of:
  generating a motor position signal having first and second edges for each phase winding which respectively define turn-on and turn-off points for a given phase winding with no phase advance;
  turning on each phase winding a delay time after a third edge of said motor position signal preceding the respective first edge, and turning off each phase winding the delay time after a fourth edge of said motor position signal preceding the respective second edge, the delay time being determined by:
    measuring the time between two successive motor position signal edges; and
    determining the delay time according to a difference between the measured time and a constant value corresponding to a desired phase advance vs. motor speed profile.

7. A phase advance commutation method for a multiple phase switched reluctance motor comprising the steps of:
  forming a quadrature signal having edges coinciding with the peak magnetic coupling positions of the motor for each phase winding, thereby defining for each phase winding first and second quadrature signal edges that align with the positive slope of the magnetic coupling position for that phase winding;
  selectively carrying out for each motor phase:
    a base commutation control wherein the phase windings are energized in substantial registry with the respective first quadrature signal edge, and de-energized in substantial registry with the respective second quadrature signal edge, and
    a fixed phase advance commutation control wherein the phase windings are energized in substantial registry with a respective third quadrature signal edge which precedes the first edge, and de-energized in substantial registry with a respective fourth quadrature signal edge the precedes the second edge, and
    a variable phase advance commutation control wherein the phase windings are energized intermediate the respective first and third quadrature signal edges, and de-energized intermediate the respective second and fourth quadrature signal edges, said variable phase advance commutation control including the steps of:
      selecting a desired rate of change of phase advance with respect to motor speed;
      measuring the time between two successive quadrature signal edges;
      computing a delay time according to the difference between the measured time and a constant corresponding to said selected rate of change of phase advance;
      energizing such winding after said third edge plus said delay time; and
      de-energizing such winding after said fourth edge plus said delay time.

* * * * *